United States Patent [19]

Hsu et al.

[11] Patent Number: 5,514,747
[45] Date of Patent: May 7, 1996

[54] POLYAMIDE-IMIDE-MODIFIED POLYURETHANE INSULATION ENAMEL COMPOSITION

[75] Inventors: Sheng Yaw Hsu, Taichung Hsien; Tzong-Ming Lee, Tainan, both of Taiwan

[73] Assignee: Industrial Technology Research Institute, Hsinchu, Taiwan

[21] Appl. No.: 390,912

[22] Filed: Feb. 17, 1995

Related U.S. Application Data

[63] Continuation-in-part of Ser. No. 127,326, Sep. 27, 1993, abandoned.
[51] Int. Cl.$^6$ .............................. C08J 3/00; C08K 3/20; C08L 75/00; C08G 18/28
[52] U.S. Cl. .................. 524/590; 525/454; 525/457; 525/458; 525/453; 528/60; 528/65; 528/66; 528/80; 528/81; 528/83; 528/84; 528/85; 528/86; 528/73; 528/170; 528/195
[58] Field of Search .................. 528/60, 65, 84, 528/85, 86, 170, 195, 66, 73, 80, 81, 83; 525/454, 457, 458, 453; 524/590

[56] References Cited

U.S. PATENT DOCUMENTS

| | | | |
|---|---|---|---|
| 3,869,428 | 3/1975 | Mosimann et al. | 528/275 |
| 5,310,850 | 5/1994 | Chen et al. | 528/73 |

Primary Examiner—Paul R. Michl
Assistant Examiner—Patrick Niland
Attorney, Agent, or Firm—W. Wayne Liauh

[57] ABSTRACT

A method for preparing a polyamide-imide-modified polyurethane varnish composition for coating a conductive wire to form a varnished wire. The method comprises the steps of: (a) preparing a first intermediate reaction product, which is an isocyanate compound, (b) preparing a second intermediate reaction product, which is a hydroxy compound, and (c) mixing the first and second intermediate reaction products with a diluent to form the polyamide-imide-modified polyurethane varnish composition. The first intermediate reaction comprises the steps of: (I) preparing a first reaction mixture containing a phenol or a derivative of phenol, a diisocyanate, and a dihydroxy compound in a first organic solvent, and reacting the first reaction mixture at room temperature; (ii) adding a diacid compound or trimellitic anhydride or mixture thereof to the first reaction mixture, and reacting at 100°~140° C.; wherein the diisocyanate is stoichiometrically equivalent to the sum of the phenol or derivative of phenol, the dihydroxy compound, and the diacid compound or the trimellitic anhydride or mixture thereof. The second intermediate reaction comprises the steps of: (I) preparing a second reaction mixture containing a diisocyanate and a dihydroxy compound in a second organic solvent, and reacting the second reaction mixture at room temperature; (ii) adding a trihydroxyl compound to the second reaction mixture, and reacting at room temperature.

18 Claims, 1 Drawing Sheet

POLYAMIDE-IMIDE-MODIFIED POLYURETHANE INSULATION ENAMEL COMPOSITION

This application is a CIP of U.S. Ser. No. 08/127,326 filed Sep. 27, 1993, now abandoned.

FIELD OF THE INVENTION

The present invention relates to a novel polyurethane-based insulation enamel composition useful for the manufacturing of enameled wires. More particularly, the present invention relates to a modified polyurethane enamel composition which can be inexpensively manufactured and provides excellent electrical and mechanical properties, as well as improved heat resistance so as to allow the enamel composition to be used at elevated temperatures.

BACKGROUND OF THE INVENTION

Wire varnishes, or the so-called wire enamels, are an important industrial commodity. One of their major applications is to make enameled wires for use in making coil windings for electrical motors, which constitute an important class of consumer goods affecting our everyday life. A wide variety of polymers, such as polyimide, polyamide, polyamideimide, polyester, polyurethane, etc., have been used in making wire varnishes. In many instances the selection of the polymeric varnish material is dictated by the temperature at which the enameled wires are expected to be used.

Polyurethanes are well-known to provide excellent electrical and mechanical properties, and are relatively inexpensive. Polyurethane varnishes have been widely used in making enameled wires; however, they exhibit relatively inferior heat resistance. Polyurethane coated wires (or varnished or enameled wires) are typically rated below 135° C.; such a low temperature rating makes polyurethane coated wires unsuitable in many important applications. Enameled wires made from modified or unmodified polyurethane also often do not exhibit satisfactory solderability. In many electrical applications, it is highly desirable to have wires which can be soldered without stripping the coating. Solderability can be expressed in several different ways, for example, it can be expressed as the time required to solder a varnished wire; the lower the time required, the better the solderability.

U.S. Pat. No. 3,869,428 discloses an enamel composition containing imide and urethane groups which are the polyurethane reaction product of a hydroxyl compound and an isocyanate compound selected in respect to each other so that at least one thereof contains imide groups and reacted with each other in a stoichiometric ratio of the hydroxyl groups and isocyanate groups. In the '428 patent, excess trimellitic anhydrides are reacted with diamine or amino acid to form imide diacid, to which ethylene glycol, trimethylene glycol or trimethylol propane is then added to cause an esterification between the hydroxyl group and the acidic group in the diacid. The reaction is controlled such that the hydroxyl groups are in excess which would react with diisocyanates. After the reaction, end NCO groups are protected, or blocked, with phenol. In a separate step, trimethylol propane reacts with diisocyanate, and the free NCO groups after the reaction are also blocked with phenol. The two reaction products are then mixed to form the polyesterimide-modified polyurethane varnish disclosed in the '428 patent. Several disadvantages have been observed from the '428 patent. First, because of the requirement of the esterification reaction as an intermediate step, the process disclosed in the '428 patent operates at undesirably high temperatures, in excess of 200° C. Also, the polyesterimide-modified polyurethane does not significantly improve the heat resistance of the final product.

Japanese Pat. App. Laid Open JP-60-3114 discloses a polymeric elastomer prepared by first reacting trimellitic anhydride with excess diisocyanate. Using α-pyrrolidone to block the unreacted NCO groups, the intermediate product was mixed with polyester polyol or polyether polyol having two hydroxy groups and a molecular weight greater than $10^4$. The process disclosed in JP-60-3114 involves a high temperature baking process which often results in nonuniform thickness of the polyurethane film and dimensional instability. Furthermore, the use of high molecular weight polyols (greater than $10^4$) substantially lowers the heat resistance of the polyurethane products; it also causes phase separation thus adversely affecting the physical properties of the final products.

U.S. Pat. No. 4,816,544 discloses a polyamideimide elastomer obtained by reaction of carboxyl-telechelic polymer having a molecular weight of 500 to 10,000, aromatic diisocyanate, trimellitic acid anhydride and a dicarboxylic acid having 4 to 18 carbon atoms in a pre-selected proportion. The composition disclosed in the '544 is only useful as an elastomer. Because it exhibits low glass transition temperature, Tg, and low heat resistance, it does not posses the required physical characteristics for use in wire coating and insulation.

SUMMARY OF THE INVENTION

The primary object of the present invention is to provide a novel polyurethane based varnish composition for use in making vanished wires which exhibits excellent mechanical and electrical properties, has application temperatures in the range of about 155° C. or above, possesses high solid content, and requires relatively short soldering time.

The primary object of the present invention is to develop an improved polyurethane based wire varnish composition comprising a polyamide-imide-modified polyurethane prepared from a monomer composition containing the following monomers:

(A) Diacid compound or Trimellitic anhydride,: preferred examples of such diacid compounds include p-, m-, and o-phthalic acid, sebacic acid and adipic acid. The diacid compound and trimellitic anhydride can be used separately or jointly.

(B) Diisocyanate: preferred examples of diisocyanate include 4,4'-diphenylmethane diisocyanate (MDI) and toluene diisocyanate (TDI).

(C) Dihydroxyl compound: preferred examples of dihydroxyl compound include 1,4-butanediol, 1,3-butanediol, ethylene glycol, diethylene glycol, 1,6-hexanediol, 2,5-hexanediol, 1,3-propanediol, 2,2-dimethyl-1,3-propanediol, 1,5-pentanediol, 2,4-pentanediol, 1,2-pentanediol, etc.

(D) Trihydroxyl compound: preferred examples of trihydroxyl compound include 1,2,3-butanetriol, trimethylolpropane, 1,2,4-butanetriol, 1,2,6-hexanetriol, trimethylolethane, 3-methylpentane-1,3,5-triol, tris(2-hydroxyethyl)isocyanurate, etc.

(E) phenol or m-, o-, or p-cresol.

More specifically, the present invention discloses a polyamide-imide-modified polyurethane varnish composition prepared by mixing a first intermediate reaction product with a second intermediate reaction product wherein:

(a) the first intermediate reaction product is an isocyanate compound prepared by a process comprising the following steps:
  (I) preparing a first reaction mixture containing a phenol or a derivative of phenol, a diisocyanate, and a dihydroxy compound in a first organic solvent, and reacting the first reaction mixture at room temperature;
  (ii) adding a diacid compound or trimellitic anhydride or mixture thereof to the first reaction mixture, and reacting at 100°~140° C.; wherein the diisocyanate is stoichiometrically equivalent to the sum of the phenol or derivative of phenol, the dihydroxy compound, and the diacid compound or the trimellitic anhydride or mixture thereof; and (b) the second intermediate reaction product is a hydroxy compound is prepared by a process comprising the following steps:
  (I) preparing a second reaction mixture containing a diisocyanate and a dihydroxy compound in a second organic solvent, and reacting the second reaction mixture at room temperature;
  (ii) adding a trihydroxy compound to the second reaction mixture, and reacting at room temperature.

The first reaction mixture for preparing the isocyanate compound is represented in molar quantities by the following relationship:

(a) M+N+0.5P+Q=E;
(b) (M+N)/(M+N+Q)=3%~60%; and
(c) (0.5P)/E=10%~24%.

And the second reaction for preparing the hydroxy compound is represented in molar quantities by the following relationship:

(d) (R+S)/F=1.05~1.3;
(e) R/F=0.7~0.9;

and the first reaction for preparing the isocyanate compound and the second reaction mixture for preparing the hydroxy compound are related by the following relationship:

(f) P/(3S+2R−2F)=0.7~1.2;

wherein:
M is the number of mols of diacid in the first monomer composition,
N is the number of mols of trimellitic anhydride in the first monomer composition,
P is the number of tools of phenol or derivatives thereof in the first monomer composition,
Q is the number of mols of dihydroxy compound in the first monomer composition,
R is the number of molds of dihydroxy compound in the second monomer composition,
S is the number of tools of trihydroxy compound in the second monomer composition,
E is the number of mols of diisocyanate in the first monomer composition, and
F is the number of mols of diisocyanate in the second monomer composition.

In the polyamide-imide-modified polyurethane varnish composition disclosed in the present invention, the isocyanate compound being represented by the following formula:

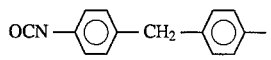
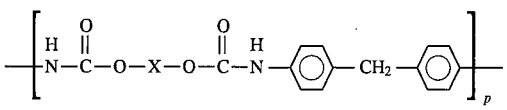
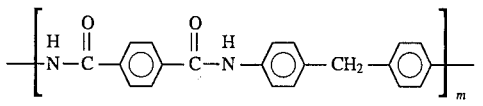
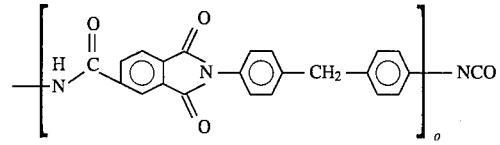

and the hydroxy compound being represented by the following formula:

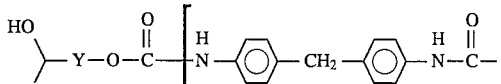
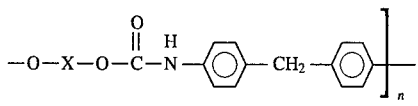
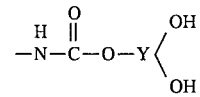

or

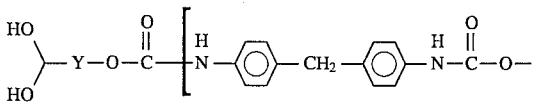
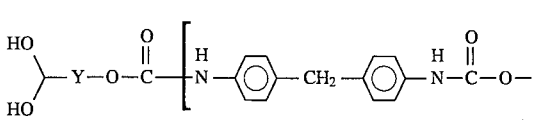
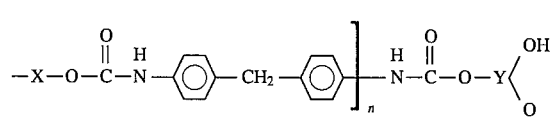
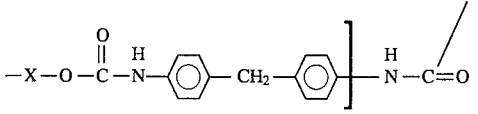

wherein X is a substituted or unsubstituted alkyl group and 10>p+m+o>2; and Y is a substituted or unsubstituted alkyl group and 10>n>1.5.

The alkyl group Y is represented by one of the following two formulas:

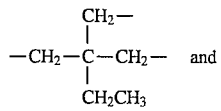

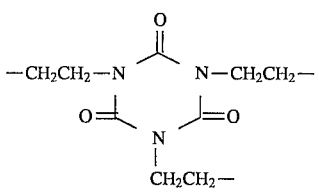

After the first intermediate reaction product (an isocyanate compound) and the second intermediate reaction product (a hydroxy compound) are prepared separately, they are mixed to obtain the polyamide-imide-modified polyurethane varnish of the present invention. The polyurethane varnish can be diluted with an appropriate diluent system to obtain a desired viscosity.

The polyamide-imide-modified polyurethane varnish of the present invention provides excellent electrical and mechanical characteristics at elevated temperatures, and thus is most advantageous for use in making vanished wires for high temperature applications. Furthermore, the polyamide-imide-modified polyurethane varnish of the present invention also provides excellent and improved solderability, a direct soldering time of only 1.7 seconds (@380° C.) is required for varnished wires prepared using the varnish composition of the present invention.

DETAILED DESCRIPTION OF PREFERRED EMBODIMENTS

Figure 1:
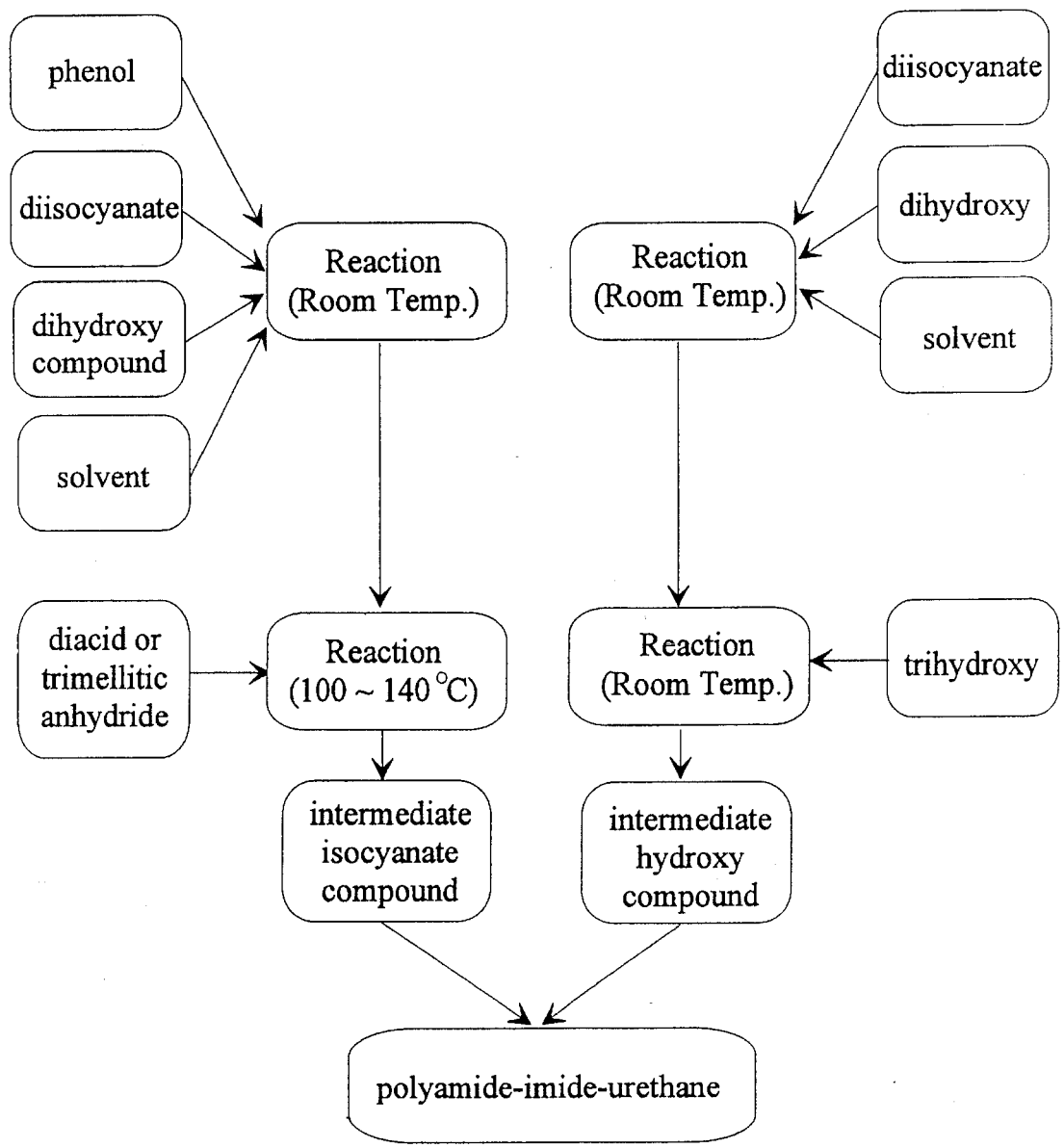
FIG. 1 is a flowchart diagram showing the steps of preparing the polyurethane varnish of the present invention.

The polyurethane composition of the present invention is a polyamide-imide-modified polyurethane which is prepared by effectuating two intermediate reactions and mixing the intermediate reaction products from the two respective reactions to form the final composition. The first intermediate reaction product is isocyanate compound being represented by the following formula:

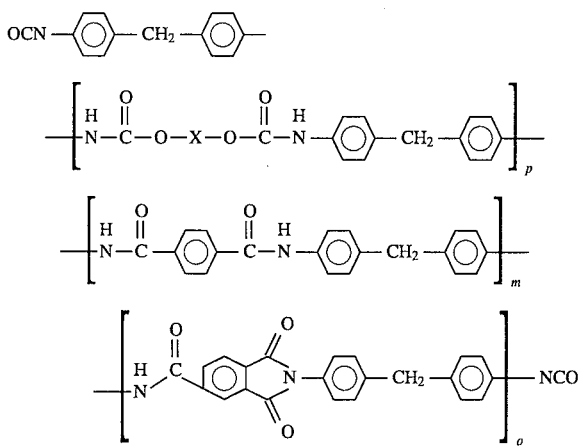

And second intermediate reaction product is a hydroxy compound being represented by the following formula:

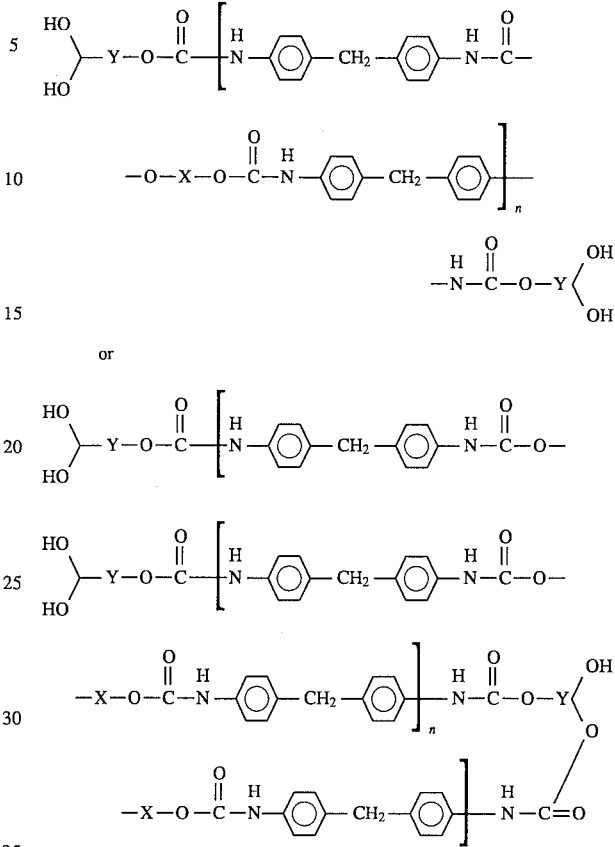

wherein X is a substituted or unsubstituted alkyl group and $10 > p+m+o > 2$; and Y is a substituted or unsubstituted alkyl group and $10 > n > 1.5$.

In the first intermediate reaction, P mols of phenol or derivatives thereof, and Q mols of at least one dihydroxyl compound or a mixture of dihydroxyl compounds are mixed with E mols of diisocyanate and a first organic solvent to start a reaction at room temperature. Then, M mols of diacid and/or N mols of trimellitic anhydride are added to the mixture, and the reaction mixture is heated to 100°~140° C. for 2~4 hours to obtain the first intermediate reaction product.

In the first intermediate reaction, the preferred relationship among the mols of the various reactants is shown below:

(a) $E = M+N+0.5P+Q$;

(b) $(M+N)/(M+N+Q) = 3\% \sim 60\%$; and (c) $(0.5P)/E = 10\% \sim 24\%$;

Equation (a) indicates that the amounts of diisocyanate (E) are in excess. The diacid (M) and/or trimellitic anhydrides (N) then react with the excess diisocyanate at elevated temperatures to form a polyamide-imide polymer having -NCO terminal groups, which eventually will react with diols (second intermediate compound) to form the polyamide-imide-urethane of the present invention.

In the second intermediate reaction, F mols of diisocyanate is dissolved in an appropriate solvent, such as dimethyl formamide, into which R mols of dihydroxyl compound is added to start a reaction at room temperature. Finally, S mols of a trihydroxyl compound is added to the reaction mixture. The reaction is allowed to continue for 1 to 2 hours to obtain the second intermediate reaction product. It is preferred to add a second organic solvent such as phenol or o-cresol to the diisocyanate, at a molar ratio of 0.03~0.1 to 1, in the reaction to form the second intermediate reaction product B.

In the second intermediate reaction, the preferred relationship among the mols of the various reactants is shown below:

(d) $(R+S)/F=1.05~1.3$; and (e) $R/F=0.7~0.9$;

Preferred diacids include aromatic and aliphatic diacids such as o-phthalic acid, m-phthalic acid, p-phthalic acid, adipic acid, sebacic acid, etc. Preferred diisocyanates include 4,4'-diphenylmethane diisocyanate, toluene diisocyanate, or a mixture thereof. Preferred phenol or the derivatives thereof include phenol, m-cresol, o-cresol, p-cresol, etc. Preferred dihydroxyl compounds include aromatic and aliphatic dihydroxyl compounds, such as 1,4-butanediol, 1,3-butanediol, ethylene glycol, diethylene glycol, 1,6-hexanediol, 2,4-pentanediol, 1,3-propanediol, 2,2-dimethyl-1,3-propanediol, 1,5-pentanediol, 1,2-pentanediol, etc, or a mixture thereof. Preferred trihydroxyl compounds include aromatic and aliphatic trihydroxyl compounds, such as 1,2,3-butanetriol, trimethylolpropane, 1,2,4-butanetriol, 1,2,6-hexanetriol, trimethylolethane, 3-menthylpentane-1,3,5-triol, tris(2-hydroxylethyl)isocyanurate, etc, or a mixture thereof.

After the two intermediate reaction products are obtained, they are mixed to form the final composition, which is then diluted with an appropriate diluent to form a polyamide-imide-modified polyurethane varnish of the present invention. Preferred diluents include N-methyl-2-pyrrolidone, N,N,-dimethyl formamide, N,N-dimethyl acetamide, xylene, toluene, m-cresol, etc, or a mixture thereof. These preferred diluents can also be used as the first organic solvent in the preparation of the first intermediate reaction product.

The proportion of the first intermediate reaction product and the second intermediate reaction product can also be adjusted to achieve a desired result. Preferably, the following relation can be used:

(f) $P/(3S+2R-2F)=0.7~1.2$;

After mixing the first intermediate reaction product with the second intermediate reaction product, the polyamide-imide-modified polyurethane varnish of the present invention can then be diluted with an appropriate solvent system to form a diluted varnish of desired viscosity.

The present invention will now be described more specifically with reference to the following examples. It is to be noted that the following descriptions of examples including preferred embodiments of this invention are presented herein for purpose of illustration and description; it is not intended to be exhaustive or to limit the invention to the precise form disclosed.

EXAMPLE 1

Preparation of First Intermediate Reaction Product:

76.83 g of isophthalic acid (i.e., m-phthalic acid) and 2601 g of 4,4'-diphenylmethane diisocyanate were placed inside a 30-liter reaction vessel. Then 4010 g of dimethyl formamide and 364 g of m-cresol were charged into the vessel and the entire reaction mixture was stirred for thirty minutes. Thereafter, 258.5 g of ethylene glycol was added to the reaction mixture and was stirred for another thirty minutes. Finally, 710.1 g of trimellitic anhydride was added to the mixture, which was heated at 120° C. for two hours. After the reaction was completed, the reaction mixture was cooled to room temperature to obtain first intermediate reaction product.

Preparation of Second Intermediate Reaction Product:

4117 g of 4,4'diphenylmethane diisocyanate was placed inside a 30-liter reaction vessel, into which 5669.4 g of dimethyl formamide was added. After stirred for ten minutes, 625.5 g of 1,4-butandiol and 257.5 g of ethylene glycol were added to the reaction mixture. The reaction mixture was stirred for ten minutes, then, after 750 g of trimethylol propane was added, it was stirred for between 1 and 2 hours. This resulted in intermediate reaction product B.

Reaction Between First and Second Intermediate Reaction Products:

First intermediate reaction product and Second intermediate reaction product B were mixed. Into the mixture, 1300 g of m-cresol and 2000 g of dimethyl formamide were added as a diluent. After stirred for 30 minutes, a polyamide-imide-modified polyurethane varnish of the present invention was obtained.

EXAMPLE 2

Preparation of First Intermediate Reaction Product:

461 g of isophthalic acid and 2601 g of 4,4'-diphenylmethane diisocyanate were placed inside a 30-liter reaction vessel. Then 3180 g of dimethyl formamide and 364 g of m-cresol were charged into the vessel and the entire reaction mixture was stirred for thirty minutes. Thereafter, 258.9 g of ethylene glycol was added to the reaction mixture and was stirred for another thirty minutes. Finally, 266.5 g of trimellitic anhydride was added to the mixture, which was heated at 130° C. for two hours. After the reaction was completed, the reaction mixture was cooled to room temperature to obtain the first intermediate reaction product.

Preparation of Second Intermediate Reaction Product:

3430 g of 4,4'diphenylmethane diisocyanate was placed inside a 30-liter reaction vessel, into which 4792 g of dimethyl formamide was added. After stirred for ten minutes, 521.3 g of 1,4-butandiol and 214.6 g of ethylene glycol were added to the reaction mixture. The reaction mixture was stirred for thirty minutes, then, after 625 g of trimethylol propane was added, it was stirred for between 1 and 2 hours. This resulted in second intermediate reaction product.

Reaction Between First and Second Intermediate Reaction Products:

First Intermediate reaction product and Second Intermediate reaction product were mixed at room temperature. Into the mixture, 253 g of m-cresol and 2000 g of dimethyl formamide were added as a diluent. After stirred for 30 minutes, a polyamide-imide-modified polyurethane varnish of the present invention was obtained.

EXAMPLE 3

Preparation of First Intermediate Reaction Product:

461 g of isophthalic acid and 2601 g of 4,4'-diphenylmethane diisocyanate were placed inside a 30-liter reaction vessel. Then 4030 g of dimethyl acetamide and 363 g of m-cresol were charged into the vessel and the entire reaction mixture was stirred for ten minutes. Thereafter, 164.7 g of ethylene glycol and 93.83 g of 1,4-butanediol were added to the reaction mixture and was stirred for another thirty minutes. Finally, 266.5 g of trimellitic anhydride was added to the mixture, which was heated to 130° C. for two hours. After the reaction was completed, the reaction mixture was cooled to room temperature to obtain the first intermediate reaction product.

Preparation of Second Intermediate Reaction Product:

4117 g of 4,4'diphenylmethane diisocyanate was placed inside a 30-liter reaction vessel, into which 5669 g of dimethyl acetamide was added. After stirred for ten minutes, 625.5 g of 1,4-butandiol and 257.5 g of ethylene glycol were added to the reaction mixture. The reaction mixture was stirred for thirty minutes, then, after 750 g of trimethylol propane was added, it was stirred for between 1 and 2 hours. This resulted in the second intermediate reaction product.

Reaction Between First and Second Intermediate Reaction Products:

The first intermediate reaction product and the second intermediate reaction product were mixed at room temperature. Into the mixture, 3392 g of dimethyl formamide and 303 g of m-cresol were added as a diluent. After stirred for 30 minutes, a polyamide-imide-modified polyurethane varnish of the present invention was obtained.

EXAMPLE 4

Preparation of First Intermediate Reaction Product:

256.1 g of isophthalic acid, and 3034.2 g of 4,4'-diphenylmethane diisocyanate were placed inside a 30-liter reaction vessel. Then 4411.2 g of dimethyl acetamide and 363.6 g of m-cresol were charged into the vessel and the entire reaction mixture was stirred for ten minutes. Thereafter, 310.2 g of ethylene glycol and 150 g of 1,4-butanediol were added and the reaction mixture was stirred for another thirty minutes. Finally 297.1 g of isophthalic acid was added to the mixture, which was heated at 130° C. for two hours. After the reaction was completed, the reaction mixture was cooled to room temperature to obtain the first intermediate reaction product.

Preparation of Second Intermediate Reaction Product:

4189 g of 4,4'diphenylmethane diisocyanate was placed inside a 30-liter reaction vessel, into which 5837.2 g of dimethyl formamide was added. After stirred for ten minutes, 257.5 g of ethylene glycol and 625.5 g of 1,4-butandiol were added to the reaction mixture. The reaction mixture was stirred for thirty minutes, then, after 750 g of trimethylol propane was added, it was stirred for between 1 and 2 hours. This resulted in the second intermediate reaction product.

Reaction Between First and Second Intermediate Reaction Products:

The first intermediate reaction product and second intermediate reaction product were mixed at room temperature. Into the mixture, 3510 g of dimethyl formamide and 348 g of m-cresol were added as a diluent. After stirred for 30 minutes, a polyamide-imide-modified polyurethane varnish of the present invention was obtained.

Comparative Example

The first part of the procedure in the preparation of the comparative example was similar to that in the preparation of the second intermediate reaction product of Example 1. 4117 of 4,4'diphenylmethane diisocyanate was placed inside a 30-liter reaction vessel, into which 5669.4 of dimethyl formamide was added. After stirred for ten minutes, 625.5 g of 1,4-butanediol and 257.5 g of ethylene glycol were added to the reaction mixture. The reaction mixture was stirred for thirty minutes, then, after 750 g of trimethylol propane was added, it was stirred for between 1 and 2 hours. This resulted in a second intermediate reaction product, which was then mixed with 8000 g of a polyesterimide vanish (ISOMID 860, from Scenectady Co.) and stirred for two hours to obtain a polyurethane varnish.

The varnish compositions prepared in the above described examples were coated on copper wires and baked in an oven. The coated wires were testes and the test results are summarized in Table 1. From Table 1, it evident that the polyamide-imide-modified polyurethane of the present invention provides superior impact resistance at elevated temperatures. Varnished wires using the polyamide-imide-modified polyurethane of the present invention also exhibits substantially improved solderability in that they required a much reduced soldering time.

The foregoing description of the preferred embodiments of this invention has been presented for purposes of illustration and description. Obvious modifications or variations are possible in light of the above teaching. The embodiments were chosen and described to provide the best illustration of the principles of this invention and its practical application to thereby enable those skilled in the art to utilize the invention in various embodiments and with various modifications as are suited to the particular use contemplated. All such modifications and variations are within the scope of the present invention as determined by the appended claims when interpreted in accordance with the breadth to which they are fairly, legally, and equitably entitled.

TABLE 1

|  | Example 1 | Example 2 | Example 3 | Example 4 | Comparative Example |
|---|---|---|---|---|---|
| Viscosity (cp) | 1850 | 1750 | 1700 | 1750 | 2500 |
| Solid content (170° C., 2 hr) | 41.5% | 42.5% | 43% | 42.5% | 43% |
| Outside diameter of finished wire (mm) | 1.064 | 1.063 | 1.064 | 1.065 | 1.064 |
| Coating thickness (mm) | 0.034 | 0.0335 | 0.034 | 0.0345 | 0.034 |
| Diameter of conductor wire | 0.996 | .0996 | .0996 | 0.996 | 0.996 |
| Oven temperature | 220/327/349 | 220/327/349 | 220/327/349 | 220/327/349 | 220/327/349 |
| Pin hole | no | no | no | no | no |
| Flexibility | good | good | good | good | good |
| Adhesivity | good | good | good | good | good |
| Breakdown voltage (kV) | 9.3 | 9.5 | 9.2 | 9.4 | 8.7 |
| Softening temperature (°C.) | 240 | 235 | 236 | 241 | 235 |

TABLE 1-continued

|  | Example 1 | Example 2 | Example 3 | Example 4 | Comparative Example |
|---|---|---|---|---|---|
| Impact resistance* (@ 1 × diameter) | excellent | excellent | excellent | excellent | poor |
| Impact resistance* (@ 2 × diameter) | excellent | excellent | excellent | excellent | poor |
| Impact resistance* (@ 3 × diameter) | excellent | excellent | excellent | excellent | poor |
| Solderability (@ 350° C.) | 2.0 sec | 1.5 sec | 1.8 sec | 2.1 sec | 4.5 sec |

*Impact resistance was measured at 175° C.

What is claimed is:

1. A polyamide-imide-modified polyurethane varnish composition comprising:

(a) an isocyanate compound, which contains amideimide groups, said isocyanate compound being represented by the following formula:

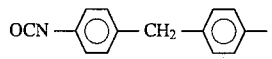

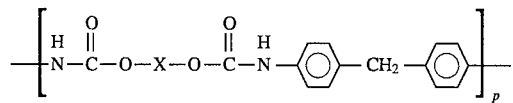

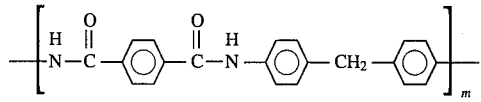

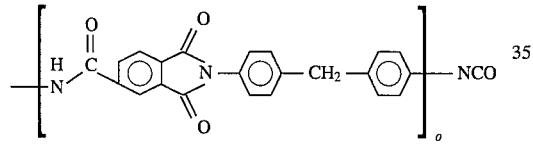

(b) a hydroxy compound, which contains urethane groups but does not contain any imide group, said hydroxy compound being represented by the following formula:

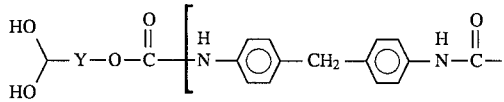

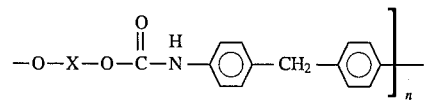

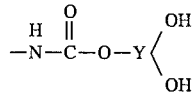

or

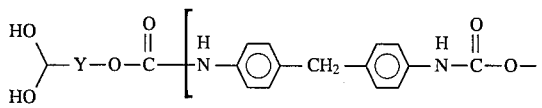

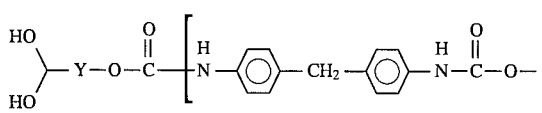

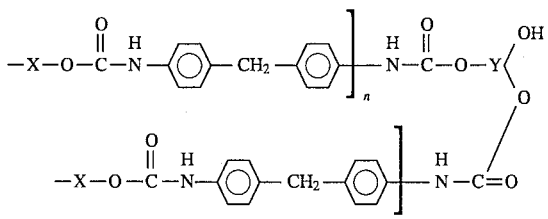

wherein X is a substituted or unsubstituted alkyl group and 10>p+m+o>2; and

Y is a substituted or unsubstituted alkyl group and 10>n>1.5.

2. A polyamide-imide-modified polyurethane varnish composition of claim 1 wherein:

(a) said isocyanate compound is prepared by a process comprising the following steps:
  (I) preparing a first reaction mixture containing a phenol, a diisocyanate, and a dihydroxy compound in a first organic solvent, and reacting said first reaction mixture at room temperature;
  (ii) adding a diacid compound or trimellitic anhydride or mixture thereof to said first reaction mixture, and reacting at 100°~140° C.; wherein said diisocyanate is stoichiometrically equivalent to the sum of said phenol, said dihydroxy compound, and said diacid compound or said trimellitic anhydride or mixture thereof; and (b) said hydroxy compound is prepared by a process comprising the following steps:
  (I) preparing a second reaction mixture containing a diisocyanate and a dihydroxy compound in a second organic solvent, and reacting said second reaction mixture at room temperature;
  (ii) adding a trihydroxy compound to said second reaction mixture, and reacting at room temperature.

3. A polyamide-imide-modified polyurethane varnish composition of claim 2 wherein said diacid is isophthalic acid.

4. A polyamide-imide-modified polyurethane varnish composition of claim 2 wherein said diisocyanate is selected from the group consisting of 4,4'-diphenylmethane diisocyanate, toluene diisocyanate, and a mixture thereof.

5. A polyamide-imide-modified polyurethane varnish composition of claim 2 wherein said diisocyanate is 4,4'-diphenylmethane diisocyanate.

6. A polyamide-imide-modified polyurethane varnish composition of claim 2 wherein said dihydroxy compound is selected from the group consisting of 4-butanediol, 1,3-butanediol, ethylene glycol, diethylene glycol, 1,6-hexanediol, 2,5-pentanediol, 1,2-pentanediol, 2,4-pentanediol, 1,3-propanediol, 2,2-dimethyl-1,3-propanediol, 1,5-pentanediol, and a mixture thereof.

7. A polyamide-imide-modified polyurethane varnish composition of claim 2 wherein said dihydroxy compound is a mixture of 1,4-butanediol and ethylene glycol.

8. A polyamide-imide-modified polyurethane varnish composition of claim 2 wherein said dihydroxy compound is ethylene glycol.

9. A polyamide-imide-modified polyurethane varnish composition of claim 2 wherein said trihydroxy compound is selected from the group consisting of 1,2,3-butanetriol, trimethylolpropane, 1,2,4-butanetriol, 1,2,6-hexanetriol, trimethylolethane, 3-methylpentane-1,3,5-triol, tris(2-hydroxyethyl)isocyanurate, and a mixture thereof.

10. A polyamide-imide-modified polyurethane varnish composition of claim 2 wherein said phenol is selected from the group consisting of o-cresol, m-cresol, and p-cresol.

11. A polyamide-imide-modified polyurethane varnish composition of claim 2 which has a high impact resistance at a temperature of about 175° C. after said polyurethane based varnish composition is coated on an conductor wire and baked in an oven to form an enamel wire.

12. A polyamide-imide-modified polyurethane varnish composition of claim 11 wherein said enamel wire has a solderability at 380° C. of less than 2.5 seconds.

13. A polyamide-imide-modified polyurethane varnish composition of claim 2 wherein said diacid compound is selected from the group consisting of o-phthalic acid, m-phthalic acid, p-phthalic acid, adipic acid and sebacic acid.

14. A polyamide-imide-modified polyurethane varnish composition of claim 2 wherein said alkyl group Y is represented by one of the following two formulas:

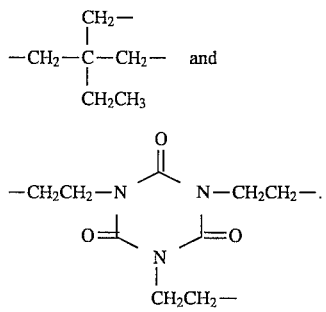

15. A polyamide-imide-modified polyurethane varnish composition prepared by mixing a first intermediate reaction product with a second intermediate reaction product wherein:

(a) said first intermediate reaction product is an isocyanate compound prepared by a process comprising the following steps:
(I) preparing a first reaction mixture containing a phenol, a diisocyanate, and a dihydroxy compound in a first organic solvent, and reacting said first reaction mixture at room temperature;
(ii) adding a diacid compound or trimellitic anhydride or mixture thereof to said first reaction mixture, and reacting at 100°~140° C.; wherein said diisocyanate is stoichiometrically equivalent to the sum of said phenol, said dihydroxy compound, and said diacid compound or said trimellitic anhydride or mixture thereof, and (b) said second intermediate reaction product is a hydroxy compound is prepared by a process comprising the following steps:
(I) preparing a second reaction mixture containing a diisocyanate and a dihydroxy compound in a second organic solvent, and reacting said second reaction mixture at room temperature;
(ii) adding a trihydroxy compound to said second reaction mixture, and reacting at room temperature.

16. A polyamide-imide-modified polyurethane varnish composition of claim 15 wherein said first reaction mixture for preparing said isocyanate compound is represented in molar quantities by the following relationship:

(a) $M+N+0.5P+Q=E$;

(b) $(M+N)/(M+N+Q)=3\%\sim 60\%$; and (c) $(0.5P)/E=10\%\sim 24\%$;

and said second reaction for preparing said hydroxy compound is represented in molar quantities by the following relationship:

(d) $(R+S)/F=1.05\sim 1.3$;

(e) $R/F=0.7\sim 0.9$;

and said first reaction for preparing said isocyanate compound and said second reaction mixture for preparing said hydroxy compound are related by the following relationship:

(f) $P/(3S+2R-2F)=0.7\sim 1.2$;

wherein:

M is the number of mols of diacid in the first monomer composition,

N is the number of mols of trimellitic anhydride in the first reaction mixture,

P is the number of mols of phenol or derivatives thereof in the first reaction mixture, Q is the number of mols of dihydroxy compound in the first reaction mixture, R is the number of mols of dihydroxy compound in the second reaction mixture, S is the number of mols of trihydroxy compound in the second reaction mixture, E is the number of mols of diisocyanate in the first reaction mixture, and F is the number of mols of diisocyanate in the second reaction mixture.

17. A polyamide-imide-modified polyurethane varnish composition of claim 15 wherein:

(a) said isocyanate compound being represented by the following formula:

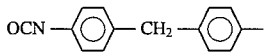
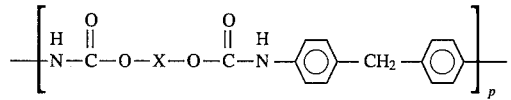
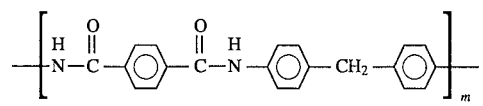
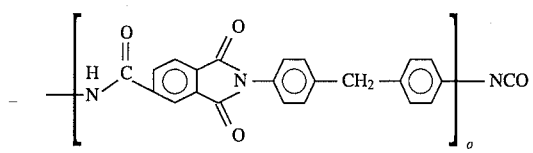

(b) said hydroxy compound being represented by the following formula:

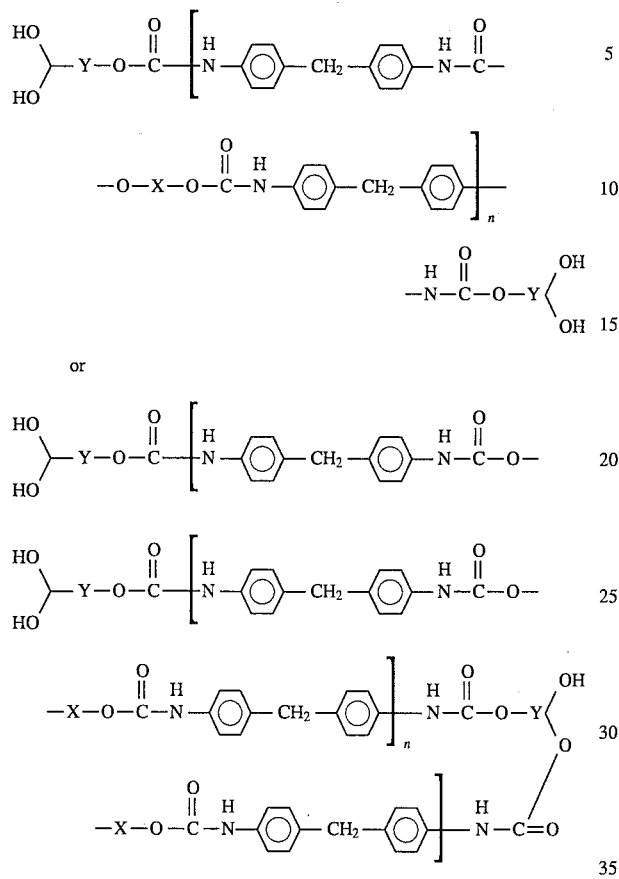

or wherein X is a substituted or unsubstituted alkyl group and 10>p+m+o>2; and Y is a substituted or unsubstituted alkyl group and 10>n>1.5.

18. A method for preparing a polyamide-imide-modified polyurethane varnish composition for coating a conductive wire to form a varnished wire, said method comprising the following steps:

(a) preparing a first intermediate reaction product, which is an isocyanate compound, by a first intermediate process comprising the following steps:

(I) preparing a first reaction mixture containing a phenol, a diisocyanate, and a dihydroxy compound in a first organic solvent, and reacting said first reaction mixture at room temperature;

(ii) adding a diacid compound or trimellitic anhydride or mixture thereof to said first reaction mixture, and reacting at 100°~140° C.; wherein said diisocyanate is stoichiometrically equivalent to the sum of said phenol, said dihydroxy compound, and said diacid compound or said trimellitic anhydride or mixture thereof;

(b) preparing a second intermediate reaction product, which is a hydroxy compound, by a second intermediate process comprising the following steps:

(I) preparing a second reaction mixture containing a diisocyanate and a dihydroxy compound in a second organic solvent, and reacting said second reaction mixture at room temperature;

(ii) adding a trihydroxyl compound to said second reaction mixture, and reacting at room temperature; and (c) mixing said first intermediate reaction product, said second intermediate reaction product, and a diluent to form said polyamide-imide-modified polyurethane varnish composition.

* * * * *